United States Patent [19]

Tran

[11] Patent Number: 5,698,123
[45] Date of Patent: Dec. 16, 1997

[54] TOASTER COMPENSATION FOR REPEATED USE

[75] Inventor: Duc Tran, Shelton, Conn.

[73] Assignee: Black & Decker Inc., Newark, Del.

[21] Appl. No.: 585,852

[22] Filed: Jan. 16, 1996

[51] Int. Cl.6 ............................................. H05B 1/02
[52] U.S. Cl. .......................... 219/492; 219/518; 219/501; 219/519; 99/329 R; 99/329 P
[58] Field of Search ........................... 219/492, 493, 219/497, 501, 505, 518, 519, 508; 99/328, 331, 329 R, 329 P, 329 RT, 327

[56] References Cited

U.S. PATENT DOCUMENTS

| | | |
|---|---|---|
| 2,842,200 | 7/1958 | Graham ................................ 161/1 |
| 3,761,668 | 9/1973 | Hamden, Jr. et al. ............ 219/10.49 |
| 4,296,312 | 10/1981 | Salem ................................... 219/501 |
| 4,395,621 | 7/1983 | Parker .................................. 219/492 |
| 4,454,803 | 6/1984 | Wolf et al. ........................... 99/329 |
| 4,518,849 | 5/1985 | Rolland ............................... 219/492 |
| 4,661,670 | 4/1987 | Eke ................................. 219/10.55 B |
| 5,094,154 | 3/1992 | Nopanen ............................... 99/328 |
| 5,402,708 | 4/1995 | Krasznai et al. .................... 95/329 R |
| 5,414,243 | 5/1995 | Snell et al. .......................... 219/492 |

Primary Examiner—Mark H. Paschall

[57] ABSTRACT

A toaster control circuit is disclosed for correcting for toaster cavity temperature variations that occur as a function of the time between toaster heating cycles. This disclosed circuit produces the same toast color during consecutive cycles, regardless of variations in the interval between heating cycles.

7 Claims, 2 Drawing Sheets

TOASTER COMPENSATION FOR REPEATED USE

BACKGROUND OF THE INVENTION

1. Field of the Invention

The present invention relates to thermal systems compensated for the variable heat accumulation produced by variable duty cycles. More particularly, the present invention relates to indirect control of food-heating cycles.

2. Discussion of Related Art

Electric toasters 10 are generally actuated by a manually-operated toast switch S2 that lowers the bread 12, and provide a selectable, continuously-variable heating time. The heating time is conventionally selected using a potentiometer R5 and the dial on the potentiometer is labeled "dark" in one direction and "light" in the other, as shown in FIG. 1. However, how dark or how light the toast actually is when a selected time period ends depends on a number of factors. Of course, different types of bread 12 toast to different colors in different periods of time, but the color of toast that emerges is also dependent on the temperature of the toaster 10 at the beginning of the toasting cycle.

In toasters where the toasting time is set by the toaster controller 14 only as a function of time, toast that is made immediately after a previous piece of toast has timed out will emerge from the toaster too brown, even though the time intervals for each piece of toast were the same, because the toaster was hotter the second time around.

On the other hand, some toasters automatically scale the selected time period as a function of the output of a cavity temperature sensor T2 inside the toaster. This is an improvement over the conventional timer-controller toaster, in that it compensates for fluctuations in the voltage supplied to the toaster and for changes in the heating efficiency of the coils. However, the problem produced by variable duty cycle times is more complex for these devices, even counter intuitive: If the toaster controller 14 varies the time interval automatically as a function of the output of a cavity temperature sensor T2 inside the toaster, the nominal toasting time set for toasting the first slice of bread will then be cut short in subsequent toasting cycles if the toaster cavity is not allowed to cool back down to room temperature. Unlike the previous example, the toast will then emerge from the toaster only half baked, i.e., too light!

SUMMARY OF THE INVENTION

In accordance with the present invention, a signal representing the length of an interval between a first heating cycle and a second heating cycle is generated. The length of the second heating period is then varied in response to said interval signal so that the quantity of heat provided does not vary with said interval.

In accordance with a particular embodiment of the present invention, said signal is generated when the length of the interval between a first heating cycle and a second heating cycle is shorter than a given time interval.

BRIEF DESCRIPTION OF THE DRAWINGS

The features and advantages of the invention will be better understood when the detailed description of a preferred embodiment given below is considered in conjunction with the drawing provided, wherein.

DETAILED DESCRIPTION OF A PREFERRED EMBODIMENT

Figure 1:
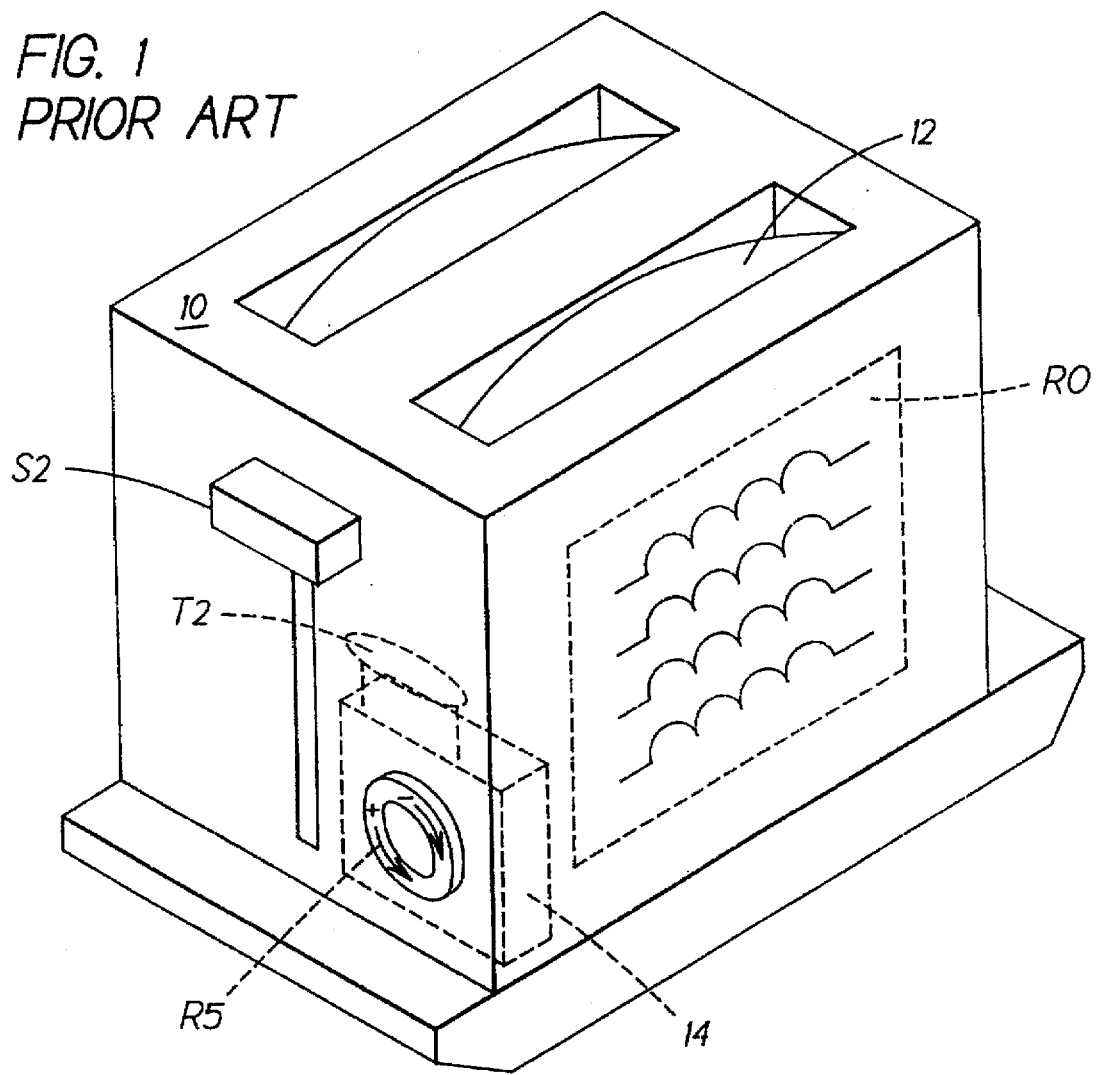
FIG. 1 is a schematic view of a toaster.
Figure 2:
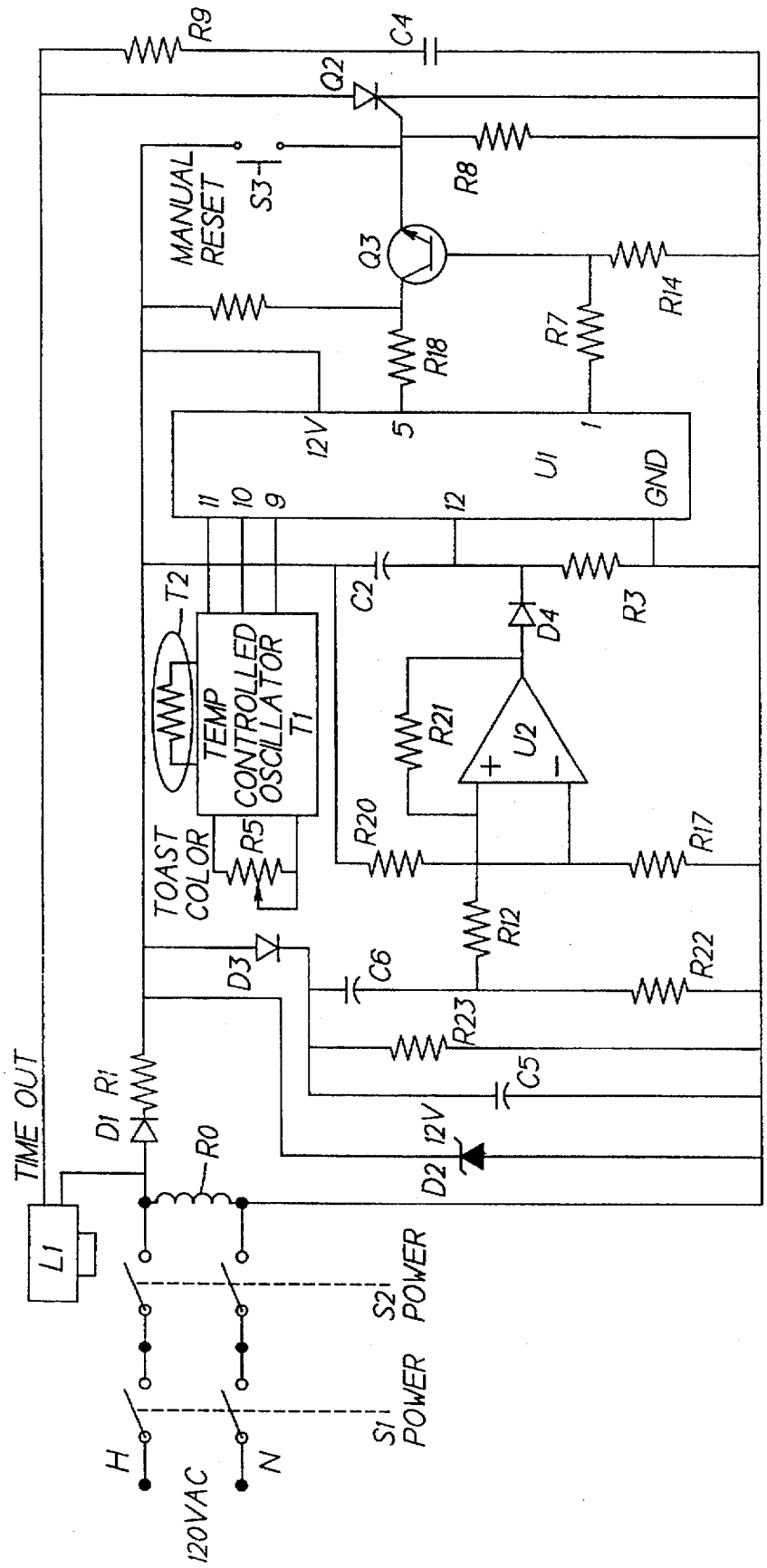
FIG. 2 is a diagram of the electronic control circuit for a toaster in accordance with the present invention.

FIG. 1 shows a toaster control circuit that provides improved control of the toast color produced in each toasting cycle. The control unit U1 times out and disconnects power to the heating elements R0 when a given number of pulses have been received at input 11 from the temperature-controlled oscillator T1. The frequency of the temperature-controlled oscillator T1 is also varied by potentiometer R5, which is the "TOAST COLOR" selector dial.

An interval compensation circuit comprising comparator U2 and its feedback resistor R21, blocking diode D3, divider resistors R20 and R17, and the RC circuit consisting of capacitors C5 and C6 and resistors R23 and R22 are connected to reset input 12 of controller U1 through diode D4.

When power is applied to the 12-volt circuit controlled by Zener diode D1 by closing the POWER and TOAST switches, S1 and S2, two capacitors C5 and C6 charge through diode D3. When the toaster times out at the end of a heating cycle, solenoid L1 is actuated and opens the TOAST switch S2, removing power from the 12-volt circuit. The capacitors C5 and C6 then continue to hold the positive input of comparator U2 high relative to the negative input governed by divider R17, R20, until C5 and C6 have discharged sufficiently to fall below the level set by that divider.

The relative high on the positive input of comparator U2 causes a high input to pin 12 of the control unit U1. The high input to pin 12 of control unit U1 holds the counter in control unit U1 in a reset state until pin 12 of U1 goes low, enabling the counter.

When pin 12 goes low, the pulses produced by oscillator T1 are then counted by U1 until a predetermined value is reached, at which time U1 produces highs at pins 1 and 5. The highs at pins 1 and 5 cause Q3 and Q2 to conduct. The conduction through Q2 completes the circuit of solenoid L1 and the solenoid L1 opens toast switch S2, ending the heating cycle.

The amount of charge present on capacitor C5 and C6 will be greater if the second heating cycle begins soon after the termination of the first cycle, because capacitor C5 and C6 will have less time to discharge through R23. The greater that charge is, the longer pin 12 on U1 will remain high and the longer the counter in U1 will be locked out, delaying the beginning of the time period controlled by oscillator T1.

Without such a delay in the beginning of the count accumulated by U1, the heat remaining in the toaster from the last heating cycle would cause a false response by the temperature sensor that controls oscillator T1, resulting in the next heating cycle being too short to provide the desired toast color. In this circumstance, the temperature control provided by oscillator T1 that provides a more accurate measure of the heat that is provided to make the toast, produces an erroneous result.

Because the oscillator T1 in this control circuit uses the cavity temperature inside the toaster, sensed by thermistor T2, as a proxy for the temperature of the bread, divergence between the temperature of the bread and the toaster cavity causes the required toasting time to vary. Thus an offset time must be provided when the bread and the cavity have not been heated together to prevent excessive variability in the resulting toast color.

The invention has been described above with particular reference to a preferred embodiment of the invention. It will be apparent to one skilled in the art that variations and modifications within the spirit of the scope of the invention are possible. For instance, it may be used for cooling, providing a negative quantity of heat to an object, or the selected time provided may need to be offset in a negative direction. The invention is defined by the appended claims.

I claim:

1. A system for controlling the duration of a toaster heating cycle comprising;

an RC network constructed to generate an oscillating timing pulse;

means to receive and count the pulses of the RC network and deactivate the toaster heating cycle upon the counting of a predetermined number of pulses; and means to delay the operation of the counter for a period of time, the duration of the period of time is inversely proportional to the duration of time between consecutive toaster heating cycles.

2. A system for controlling the duration of a toaster heating cycle as described in claim 1 wherein the delay means comprises a capacitor network connected in the control circuit to be charged during the toaster heating cycle, said charged capacitor disabling the counter until it discharges to a predetermined level.

3. A temperature control circuit for providing a predetermined quantity of heat to an object retained in a cooking cavity in each heating cycle, said circuit comprising:

a heating element to provide said quantity of heat for a selected period of time;

first circuit means for controlling a desired level of darkness for said object as a consequence of providing said heat;

temperature sensing means for sensing the temperature within said cavity;

circuit means responsive to the sensed cavity temperature for generating a first control signal when the sensed temperature is related to the desired level of darkness of said object;

a controller for receiving said first control signal and having an active state and an inactive state, said controller when in said active state generating a second control signal in response to said first control signal to terminate said heating cycle; and an interval compensation circuit for maintaining said controller in said inactive state for a period of time to prevent generation of said second control signal even though said first control signal has been transmitted to said controller.

4. A temperature control circuit in accordance with claim 3 wherein said controller includes a timer for delaying generation of said second control signal for a predetermined period of time after receipt of said first control signal when said controller is in an active state.

5. A temperature control circuit in accordance with claim 3 wherein said interval compensation circuit includes a timer which maintains said controller in said inactive state in inverse relationship to the time elapsed since the previous heating cycle.

6. A temperature control circuit in accordance with claim 3 wherein said first circuit means includes a temperature controlled oscillator.

7. A method of heating food in a cavity to a predetermined cooked state comprising the steps of:

monitoring the temperature within said cavity;

generating a control signal to discontinue heating of said food in said cavity when the temperature in the cavity reaches a predetermined level; and retarding the generation of said control signal in inverse proportion to the elapsed time since the previous heating cycle.

* * * * *